(No Model.)

J. R. DEADMORE.
FRUIT DRIER.

No. 344,637. Patented June 29, 1886.

Witnesses: Inventor:

United States Patent Office.

JAMES R. DEADMORE, OF ABINGDON, VIRGINIA.

FRUIT-DRIER.

SPECIFICATION forming part of Letters Patent No. 344,637, dated June 29, 1886.

Application filed October 7, 1885. Serial No. 179,230. (No model.)

*To all whom it may concern:*

Be it known that I, JAMES R. DEADMORE, a citizen of the United States, residing at Abingdon, in the county of Washington and State of Virginia, have invented certain new and useful Improvements in Fruit-Driers, of which the following is a specification, reference being had therein to the accompanying drawings.

This invention relates to fruit-driers of the kind in which hot water is circulated near the articles to be dried, and the heat arising therefrom utilized to effect the drying.

The object of the present invention is to produce a drier in which the entire surface upon which the fruit is placed will become heated by the hot water utilized. Further, the object is to produce a drier in which the fruit is exposed to the air and in no way shielded therefrom by racks, &c., in which trays holding fruit to be dried are usually placed, thus obtaining whatever evaporating qualities may be possessed by the air.

With these objects in view, my invention consists, essentially, of a series of shallow boxes, made of wood and metal, through which heated water is circulated, and upon the surface of which the fruit to be dried is placed, having combined therewith a novel means for causing the circulation through the said boxes.

In order that those skilled in the art to which my invention appertains may know how to make and use my invention, I will now proceed to describe the same in connection with the accompanying drawings, in which—

Figure 1:
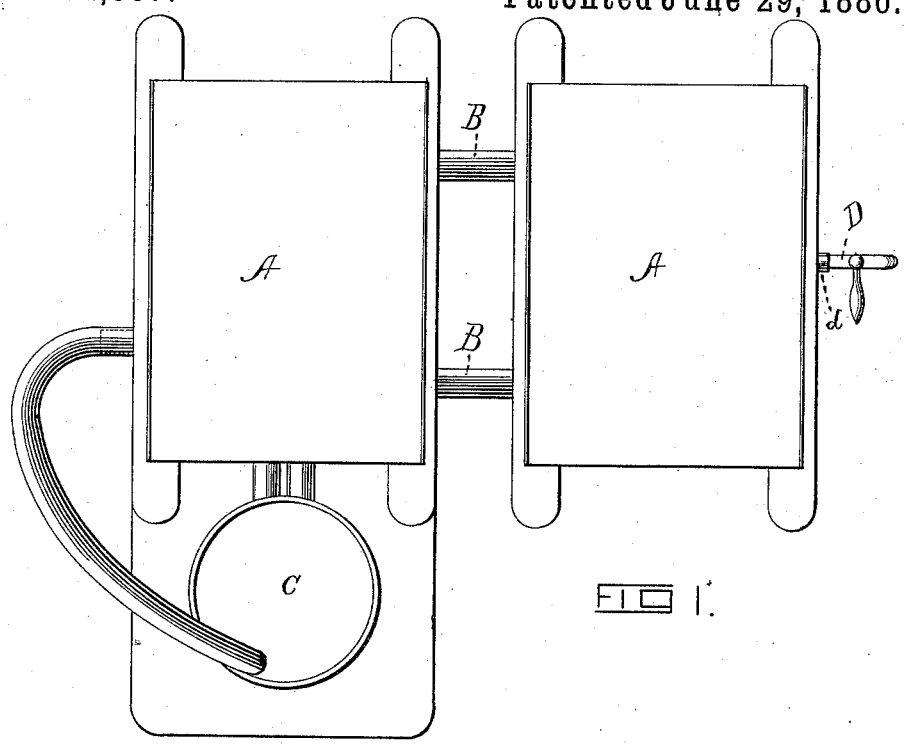
Figure 2:
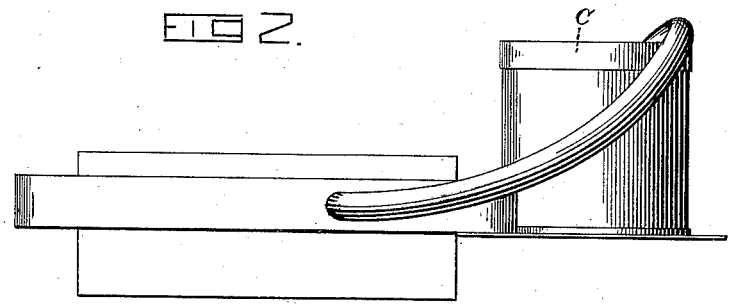

Figure 1 is a plan view of my improved drying apparatus, and Fig. 2 is an end view showing the means of introducing the heated water.

In these figures, A A' represent shallow boxes, the tops and bottoms of which are composed of metal, preferably sheet-iron, and the sides are made of wood. Any desired number of these boxes may be used, and connected by means of pipes B, placed at the sides.

In order that a continuous supply of hot water and steam may be kept circulating through the drying-boxes, I provide the reservoir c, which is kept full of water, and under which a fire is kept burning while the drier is in operation. As the water in this tank becomes heated, it naturally rises, and a strata of hot water constantly kept at the top. This heated water is conveyed from the top of the reservoir to the first drying-box by means of a siphon, D, the lower end of which communicates with the drying-box at a point, d, and it is conducted from this drying-box to the others of the series that may be used by means of the pipes B.

In order that a continuous supply of hot water may be had in the drying-boxes, I provide a communication between the lower part of the said boxes and the lower part of the reservoir, so that as the water in the boxes becomes cooled by coming in contact with the metal of which the drying-boxes are made it naturally moves down to the lower part of the boxes, and as the water in the boxes is constantly being displaced by the water introduced by the siphon, this cooled water is carried around to the reservoir, where it is heated, rises to the top of the said reservoir, and is introduced into the drying-box by the siphon.

In order that danger of bursting the drying-boxes by the accumulation of steam may be avoided, I provide the drying-boxes with one or more safety-valves of any desired construction.

Having thus described my invention, what I claim as new, and desire to secure by Letters Patent, is—

1. A fruit-drier consisting of a series of shallow boxes arranged in a horizontal plane, the hot-water reservoir, and the siphon for conveying water from the reservoir to the drying-boxes.

2. The combination, in a fruit-drier, of the series of boxes arranged in horizontal plane and connected by pipes, and the reservoir communicating with the boxes at top and bottom.

In testimony whereof I affix my signature in presence of two witnesses.

JAMES R. DEADMORE.

Witnesses:
D. C. ZOLLICKOFFER,
W. T. GRAHAM.